United States Patent [19]

Zibrida

[11] Patent Number: 4,657,680

[45] Date of Patent: Apr. 14, 1987

[54] WASTEWATER TREATMENT

[75] Inventor: John F. Zibrida, St. Petersburg, Fla.

[73] Assignee: AMAX Inc., Greenwich, Conn.

[21] Appl. No.: 796,825

[22] Filed: Nov. 12, 1985

[51] Int. Cl.[4] .............................. C02F 1/20; C02F 1/52
[52] U.S. Cl. ........................................ 210/713; 55/53;
 55/70; 210/718; 210/724; 210/726; 210/903;
 210/906; 210/915; 423/321 R
[58] Field of Search ............... 55/53, 55, 70; 210/702,
 210/713, 714, 718, 724–728, 750, 903, 906, 915;
 423/158, 238, 305, 310, 321 R, 357

[56] References Cited

U.S. PATENT DOCUMENTS

| | | | |
|---|---|---|---|
| 3,551,332 | 12/1970 | Baumann | 210/915 |
| 3,725,265 | 4/1973 | Legal | 210/915 |
| 4,045,341 | 8/1977 | Tsuruta et al. | 210/718 |
| 4,093,544 | 6/1978 | Ross | 210/718 |
| 4,306,978 | 12/1981 | Wurtz | 210/750 |
| 4,320,012 | 3/1982 | Palm et al. | 210/713 |

FOREIGN PATENT DOCUMENTS

| | | | |
|---|---|---|---|
| 50-47456 | 4/1975 | Japan | 210/915 |
| 54-109248 | 8/1979 | Japan | 210/727 |

OTHER PUBLICATIONS

Mooney et al., "Removal of F & P from H2PO4 Wastes with 2-Stage Lime Treatment," Ind. Wastes Conf., Purdue University, 1978, pp. 286–295.
Culp et al., *Handbook of Advanced Wastewater Treatment*, 2nd Edition, Von Nonstrand Reinhold Company, pp. 298–316.
Williams, *Waste Production & Disposal in Mining, Milling & Metallurgical Industries*, Miller Freeman Publications, 1975.
Process Design Manual for Nitrogen Control, U.S. EPA, Oct. 1975.

*Primary Examiner*—Peter Hruskoci

*Attorney, Agent, or Firm*—Michael A. Ciomek; Eugene J. Kalil

[57] ABSTRACT

A method is provided for the treatment of wastewater of pH ranging from about 1.5 to 3 containing at least about 100 ppm phosphorus as phosphate ions, at least about 50 ppm fluorine as fluoride ions and ammonia in excess of about 15 ppm $NH_3(N)$—T, the method comprising removing the phosphate and fluoride ions from the wastewater in a two-stage precipitation step; the first stage precipitation being conducted at a pH ranging from about 3.5 to 6.5 using an alkaline material selected from the group consisting of limestone ($CaCO_3$) and lime [$CaO$ or $Ca(OH)_2$] sufficient to form a precipitate which is removed to provide a filtrate of the wastewater which is treated in a second stage precipitation at a pH of at least about 10.5 using lime as the alkaline material sufficient to form a precipitate which is removed to provide substantially a clear effluent containing ammonia. The method also includes, if necessary, treating the ammonia-containing effluent with an alkaline material selected from the group consisting of lime and caustic sufficient to raise the pH to provide a free ammonia equivalence (FAE) of at least about 12.4; the free ammonia equivalence being determined as follows:

$$FAE = pH + (\theta/15)^{0.5},$$

wherein pH is the pH value of the effluent and $\theta$ is the temperature of said effluent in degrees Fahrenheit. The effluent is then gas stripped to lower the total ammonia content thereof to a value of less than about 10 ppm $NH_3(N)$—T. The gas stripping is controlled to maintain the free ammonia equivalence of the effluent at a value of at least about 12.4, following which the stripped effluent is acidified to lower the un-ionized ammonia content to less than about 0.05 ppm $NH_3(N)$.

17 Claims, 3 Drawing Figures

WASTEWATER TREATMENT

This invention relates to a method for treating phosphate-containing wastewater in order to remove polluting constituents therefrom, such as phosphate ions, fluoride ions, and ammonia-nitrogen.

STATE OF ART

It is known to treat wastewater to remove phosphate ions and fluoride ions therefrom, and in particular, ammonia-nitrogen [$NH_3(N)$—T], in order to minimize pollution of the environment. State and federal agencies have steadily increased the requirements for wastewater treatment, the elimination of ammonia and other impurities to substantially non-toxic levels being an essential and important requirement before the effluent thereof is disposed of into the immediate environment.

Ammonia concentrations, whether total ammonia or un-ionized ammonia, are expressed on the basis of the amount of nitrogen contained in the ammonia. In order to emphasize the use of this basis of measurement, total ammonia will be symbolically expressed as "$NH_3(N)$—T" and un-ionized ammonia or free ammonia as "$NH_3(N)$".

A particular wastewater of concern is that derived from the manufacture of phosphate chemicals and/or wastewater derived from fertilizer plants. Such wastewaters, which are generally stored in ponds, usually contain fluoride ions, phosphate ions, and ammonium ions, among other impurities. Ammonia as un-ionized ammonia [$NH_3(N)$] is particularly critical, especially if disposed of in surface waters, such as streams, harbors, etc., containing fish life or other forms of aquatic life. Fish are very sensitive to small amounts of un-ionized ammonia, in the neighborhood of less than about one part per million.

It is known to treat phosphate-containing wastewater. For example, in U.S. Pat. No. 4,320,012 to Palm et al, a method is disclosed for treating wastewater derived from phosphoric acid manufacture. In phosphate complexes of the type for the manufacture of phosphate chemicals or for the manufacture of wet process phosphoric acid, water is employed as a coolant for gas streams created within the complex. According to the Palm et al patent, the cooling water absorbs and dissolves various materials and is sent to a pond for cooling. Such waters have a pH in the range of about 1.5 to 2 and contain dissolved solids, such as fluorides and phosphates.

Because limits have been set by various state and federal agencies as to the acceptable amounts of fluorides, phosphates, and ammonia [$NH_3(N)$—T] permitted in surface waters, such impurities must be removed before wastewater is disposed of into the environment.

The method proposed by Palm et al for removing phosphates and fluorides comprises neutralizing the wastewater in two stages. The acidic wastewater is first neutralized to a pH of about 3 to 4.5 to precipitate solids therefrom, said solids comprising calcium fluoride, calcium phosphate and calcium sulfate or gypsum, where sulfate ions are present. The neutralizing agent employed may be finely divided limestone ($CaCO_3$) or lime (CaO or $Ca(OH)_2$), limestone being preferred in the first stage neutralization for economic reasons.

Following removal of the precipitate, the aqueous effluent remaining is neutralized further in a second stage at a pH of about 9 to 10 using lime wherein a flocculent precipitate is obtained which further reduces the amount of retained fluorides and phosphorus to meet the limits prescribed by federal and state regulatory agencies. However, when this process is conducted on a commercial scale, the final effluent, following the second neutralization, tends to have a milky appearance (i.e., still contains significant amounts of suspended solids) and may require additional dilution water of higher purity to achieve receiving water standards for impurity discharge. In addition, this patent does not disclose a method for the removal of ammonia from wastewater.

The prior art is replete with methods for removing ammonia from wastewater. For example, in U.S. Pat. No. 4,045,341 a method is disclosed for treating wastewater containing ammonium ions, sulfate ions and organic substances. Calcium hydroxide or calcium oxide is added to the wastewater to lower the sulfate ion concentration and to liberate the ammonium ions as un-ionized ammonia. The ammonia is then removed by stripping with hot air.

According to U.S. Pat. No. 4,093,544, wastewater is de-ammoniated by first increasing the pH of the water to over 10 following which a vacuum is applied to the upper surface thereof, whereby the ammonia is desorbed from the wastewater effluent. Temperature is important for achieving high conversion. Thus, at a pH of 10.5 and a temperature of 20° C., there is a 90% conversion to free ammonia.

U.S. Pat. No. 4,306,978 discloses a method for the lime stabilization of wastewater sludge. The sludge is dewatered to a solids content of about 10% to 60% by weight. Calcium oxide is then added to provide a high pH (e.g., increase it to 11) and cause a rise in temperature to 95° C.–100° C. This destroys microorganisms and also produces free ammonia which is recovered.

According to the state of the art discussed in the aforementioned U.S. Pat. No. 4,093,544, ammonia stripping of ammonia-nitrogen from wastewater has at least some theoretical advantages in that this system can treat effluent from conventional wastewater treatment equipment. Circulated air, as the stripping agent removes a certain portion of the ammonia as free ammonia, provided the pH of the wastewater is increased to concentrate the nitrogen in the form of ammonia gas within the wastewater compared to the amount of nitrogen in the form of dissolved ammonium ions. However, ammonia stripping does not remove all of the ammonia.

It would be desirable to provide a method for treating wastewater derived during the manufacture of phosphoric acid or other phosphate chemicals wherein phosphate and fluoride impurities are removed and wherein a clear, non-milky effluent is provided. It would also be desirable to include within the aforementioned method an improved ammonia stripping system using known equipment wherein substantially high concentrations of ammonia of over about 15 ppm can be treated to provide removal of total ammonia [$NH_3(N)$—T] in the effluent to a level not exceeding about 10 ppm and by subsequent treatment decrease the level still further to an un-ionized ammonia content of less than about 0.05 ppm and, more preferably, not exceeding about 0.02 ppm.

OBJECTS OF THE INVENTION

It is thus an object of the invention to provide a method for removing impurities from wastewater and provide an effluent thereof that can be safely discharged into the environment after suitable pH adjustment.

Another object is to provide an improved method for treating wastewater from which phosphate and fluoride ions have been previously removed, the total ammonia being stripped to less than 10 ppm and the un-ionized ammonia lowered to less than about 0.05 ppm.

Other objects will more clearly appear when taken in conjunction with the following disclosure, the appended claims and the accompanying drawings, wherein:

SUMMARY OF THE INVENTION

Figure 1:
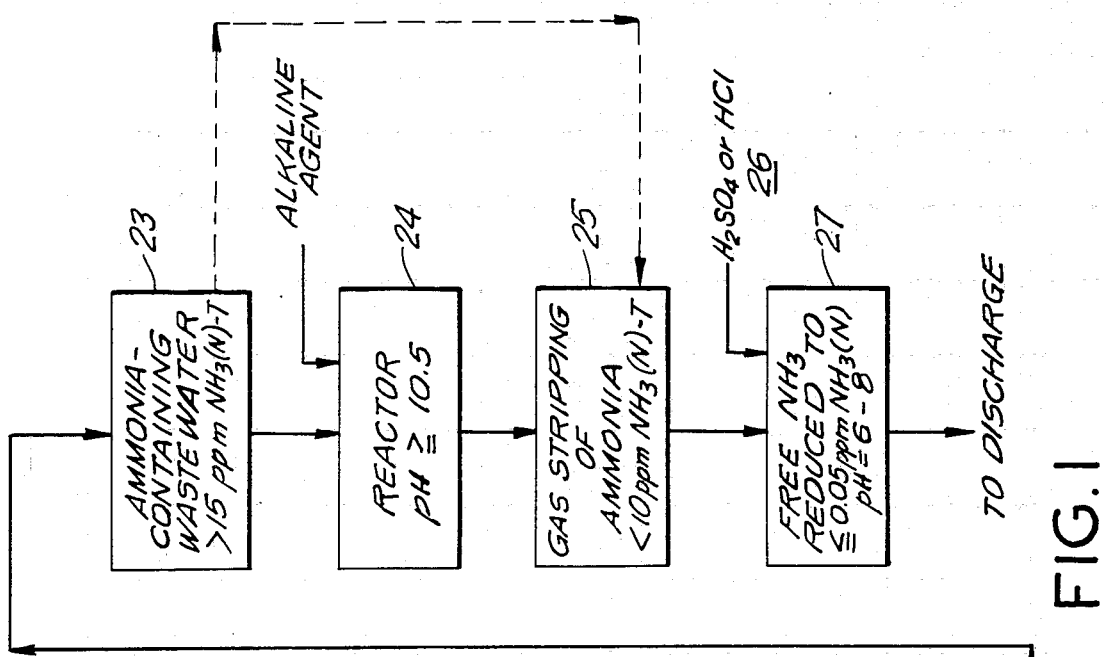
FIG. 1 is a flow sheet for treating phosphate-containing wastewater in which ammonia is the last of the impurities removed.
Figure 1:
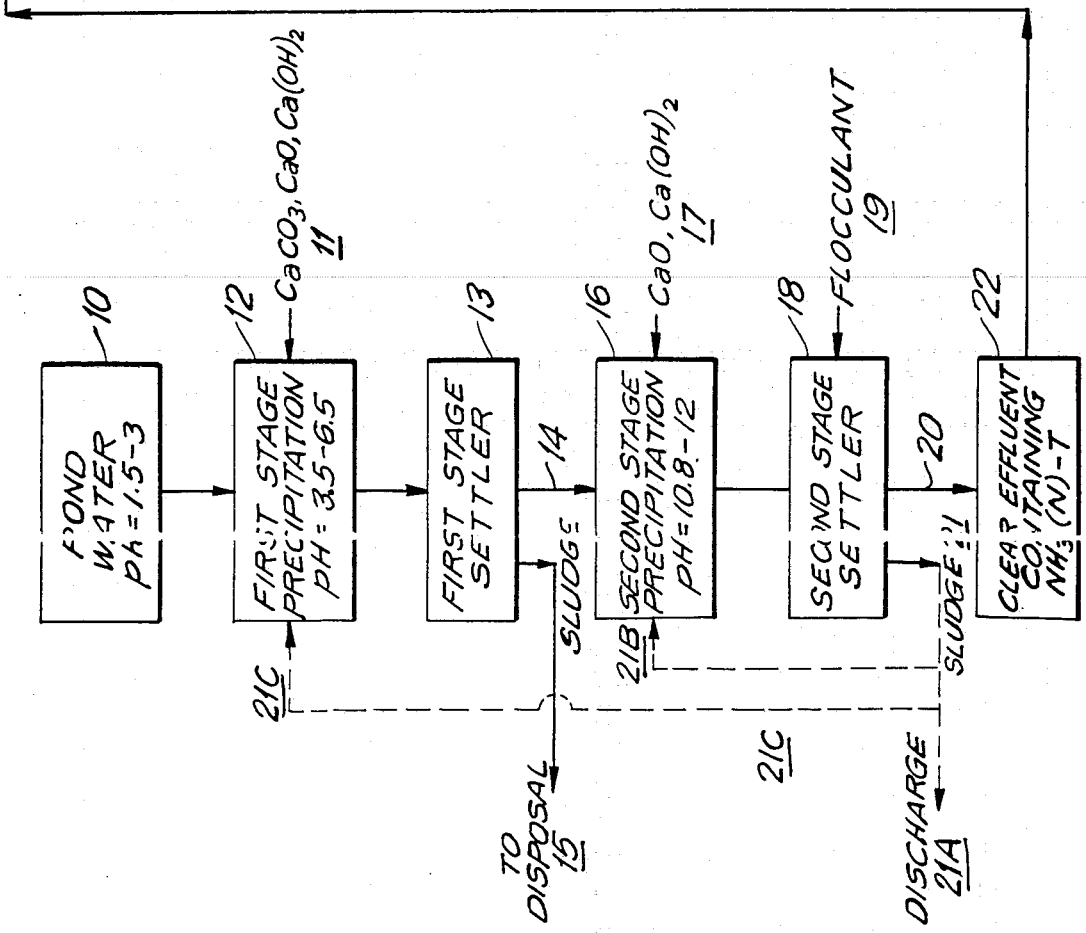

The invention is carried out using two process stages; a first process stage in which the phosphate and fluoride ions are removed and a second process stage in which the ammonia is removed.

As stated hereinabove, the Palm, et al. patent discloses a method for treating phosphate-containing wastewater for removing impurities therefrom by using a double-neutralization process in which acidic wastewater of pH about 1.5 to 2.0 is neutralized in a first stage with finely divided limestone ($CaCO_3$) to a pH of about 4 to remove such impurities as fluoride ions, phosphate ions, and the like, in the form of a precipitate which is removed to provide an effluent or raffinate which is treated in a second stage by further neutralization to raise the pH to about 9 to 10 to precipitate additional fluorides and phosphates, generally as a flocculent precipitate having a low settling rate.

However, as stated earlier, the final effluent, following removal of the second precipitate, tends to still contain significant amounts of fluoride, phosphates, and suspended solids which may not comply with standards for receiving waters. The solids tend to deposit due to delayed precipitation downstream of the discharge point which can have an adverse affect on the subsequent treating steps.

Thus, with the present invention, there is a substantial reduction in delayed precipitation downstream of discharge such that there is an increase in overall efficiency of the method. Scaling is minimized, particularly at the spray nozzles and on the bed packing material used in the spray towers.

In addition, by removing the phosphate and fluoride ions, among other impurities first, the potential of decreasing the total ammonia $NH_3(N)$—T content to below 10 ppm during gas stripping is improved.

In addition, I have found that by carrying out the second stage precipitation at a higher neutralization pH of at least about 10.5, e.g., about 10.8 to about 12, more efficient settling characteristics are obtained and lower amounts of fluorides, phosphates and suspended solids are achieved. I have further found that less flocculating agents are required to collect the precipitate, thus decreasing the cost of treatment of the overall process. I have also found that I can produce a substantially clear effluent from which ammonia can be removed directly and readily.

Advantageously, at least a portion of the sludge from the second stage settler may be recycled to the second stage precipitation to further improve lime utilization and the settling characteristics prior to ammonia removal.

In summary the invention is directed to a method for the treatment of wastewater of pH ranging from about 1.5 to 3 containing at least about 100 ppm phosphorus as phosphate ions, at least about 50 ppm fluorine as fluoride ions and ammonia in excess of about 15 ppm $NH_3(N)$—T. The method comprises first removing the phosphate and said fluoride ions from the wastewater in a two-stage precipitation step; the first stage precipitation being conducted at a pH ranging from about 3.5 to 6.5 using an alkaline material selected from the group consisting of limestone ($CaCO_3$) and lime [CaO or Ca(OH)$_2$] sufficient to form a precipitate which is removed to provide an effluent of the wastewater which is treated in a second stage precipitation at a pH of at least about 10.5 using lime as the alkaline material sufficient to form a precipitate which is removed to provide substantially clear effluent containing ammonia.

The ammonia-containing effluent is then treated with an alkaline material selected from the group consisting of lime and caustic sufficient to raise the pH to provide a free ammonia equivalence (FAE) of at least about 12.4; the free ammonia factor being determined as follows:

$$FAE = pH + (\theta/15)^{0.5}$$

wherein pH is the pH value of the effluent and $\theta$ is the temperature of the wastewater in degrees Fahrenheit. The effluent is then gas stripped to lower the total ammonia content thereof to a value of less than about 10 ppm $NH_3(N)$—T, the gas stripping being controlled to maintain the free ammonia equivalence of the effluent of at least about 12.4. The stripped effluent is then acidified to lower the un-ionized ammonia content to less than about 0.05 ppm $NH_3(N)$.

DETAILS OF THE INVENTION

In its broad aspects, the present invention, employs two processing steps in which solids are removed in the first process step and ammonia removed in the second process step.

A typical pond water containing phosphate ions, fluoride ions and ammonia-nitrogen which may be treated in accordance with the invention has the following composition:

TABLE 1

| Substance | Range, ppm |
| --- | --- |
| pH | 1.5–3 |
| Fluoride ions (F) | 500–8000 |
| Phosphate ions (P) | 1000–10,000 |
| Total solids (TDS)* | 10,000–50,000 |
| Total $NH_3(N)$—T | 50–1,000 |

*Total dissolved solids.

THE FIRST PROCESS STEP

In carrying the invention into practice, the first process step includes a first stage precipitation which is accomplished using lime [CaO, Ca(OH)$_2$] or limestone ($CaCO_3$), the choice depending upon economic considerations. The amount added is sufficient to raise and maintain the pH to about 3.5 to 6.5. Referring to FIG. 1 of the drawings, lime or limestone 11 is added to acidic pond water or wastewater 10 fed to first stage precipitation 12 to raise and maintain the pH to about 3.5 to 6.5. The lime or limestone may be added as a slurry or as a solid. The wastewater with the liming reagent therein is uniformly mixed at said pH of about 3.5 to 6.5.

Following mixing, during which solids precipitate from solution, the wastewater is passed on to first stage settler 13 where the precipitate is collected as a slurry and solid/liquid separation effected at 14, with the solids removed as sludge for disposal at 15. The aqueous effluent remaining is passed to second stage precipitation 16 to which lime 17 [CaO and/or Ca(OH)$_2$] is added preferably as a slurry, sufficient to raise and maintain the pH to at least about 10.5, and preferably at about 10.8 to about 12.

It is important to maintain the pH at such high levels as the precipitate that forms settles more efficiently and clarifies more easily. In addition, less flocculant 19 is required to collect the precipitate, for example, less than 25% of what is normally used for the purpose. Any flocculant well known in the art can be used. Following settling at 18 (second stage settler), a substantially clear non-milky aqueous effluent 20 is obtained after removal of sludge 21 by solid/liquid separation, a portion of the sludge 21B (about 30% to 90% by volume) being preferably recycled to second precipitation stage 16 to improve lime utilization and settling characteristics. The remaining sludge 21 being discharged (21A) and/or recycled as 21C to first stage precipitation 12.

The sludge 21 removed from the second precipitation stage is comprised of fluorides and phosphates and unreacted lime. The aqueous effluent 20 after pH adjustment meets the standards of the federal and state regulatory agencies for fluorides, phosphates and total solids, but does not meet the standards for the ammonia content.

Second stage precipitation to pH values in excess of about 10.5 significantly lowers the final concentration of phosphate and fluoride ions in the effluent. Two stage liming is currently conducted to provide a final pH value of approximately 9.5 so that the effluent can be discharged without further treatment. It appears that the solubility of calcium fluoride passes through a minimum at a pH value of about 5.5, after which point the solubility increases to a second maximum. I have found that by using the pH value of about 10.5 during the second stage neutralization, the fluoride ion concentration can be lowered to less than about 10 ppm (F), and advantageously to less than about 5 ppm (F), as compared to present commercial practice values of up to about 20 ppm (F) or more. At final pH values in excess of about 10.5 the phosphate ion concentration is lowered to less than about 5 ppm (P), e.g., less than about 2 ppm (P), as compared to present commercial practice of between about 15 to 25 ppm (P).

Phosphates concentrations are expressed as phosphorus contained in the phosphates. In order to emphasize the use of this basis of measurement, phosphorus will be symbolically expressed as (P).

Under current practice, at a pH level of about 9.5, the effluent 20 upon discharge contains an excess of about 20 ppm phosphate (P) which continues to precipitate with time. This results in an increase in suspended solids content, which suspended solids may deposit downstream of said discharge. The elevated level of phosphate occurring after discharge is disadvantageous because it increases the nutrient loading of the receiving waters. The method in accordance with the present invention avoids these problems by lowering the phosphate ion content upon discharge at 22 to such low levels that delayed precipitation is minimized or eliminated.

SECOND PROCESS STEP

Following production of the clear effluent at 22 of the flow sheet, the effluent is then treated for ammonia removal, the amount of ammonia in the effluent being in excess of about 15 ppm NH$_3$(N)—T.

The process comprises treating the wastewater with an alkaline material selected from the group consisting of lime and caustic sufficient to provide a free ammonia equivalence (FAE) therein of at least about 12.4, said free ammonia equivalence being determined as follows:

$$FAE = pH + (\theta/15)^{0.5}$$

wherein pH is the pH value of the treated wastewater and $\theta$ is the temperature of the wastewater in degrees Fahrenheit. Following the alkaline treatment, the process further comprises gas stripping the treated wastewater to remove ammonia therefrom, the stripping operation being controlled to maintain the free ammonia equivalence of the phase being stripped at said value of at least about 12.4 to lower the ammonia content of the treated wastewater to a value of about less than 10 ppm NH$_3$(N)—T and acidifying the wastewater depleted in ammonia to lower the un-ionized ammonia content to less than about 0.05 ppm NH$_3$(N).

Referring to FIG. 1, ammonia-containing wastewater 23 containing in excess of 15 ppm NH$_3$(N)—T is fed to reactor 24 to which an alkaline reagent selected for the group consisting of lime or caustic is added to provide an exit effluent having a free ammonia equivalence of at least about 12.4, advantageously above about 12.5. The free ammonia equivalence being determined as follows: $FAE = pH + (\theta/15)^{0.5}$ wherein pH is the pH value of the treated wastewater and $\theta$ is the temperature of the wastewater in degrees Fahrenheit. The free ammonia equivalence enables the operator to adjust the pH value of the wastewater exiting reactor 24, for example, to at least about 10.5. However it may be lower or higher, e.g., about 10.5 to about 12, taking into account the conditions that will be encountered during the gas stripping operation. If wastewater 23 has a free ammonia equivalence of at least about 12.4 as a result of the first process step, wastewater 23 can be sent directly to gas stripping at 25 as shown by dotted line 23A.

The effluent from reactor 24 is subjected to gas stripping at 25 to a total ammonia content of less than about 10 ppm. Gas stripping can be accomplished in spray towers, spray ponds, or by spraying gases through the treated effluent. Spray towers or spray ponds provide greater liquid-gas contact and are therefore, significantly more efficient in stripping ammonia from the wastewater. Air sparging provides less efficient liquid-gas contact and promotes carbon dioxide absorption, thereby necessitating the use of greater amounts of lime or caustic and handling equipment. The stripping gas can be air, excess process steam, or the products of combustion of a fuel.

Regardless of the type of gas stripping employed, it is important that the free ammonia equivalence in the phase being stripped be maintained at a value at least about 12.4. Thus, when sparging a body of wastewater, the temperature and pH of the body of wastewater must be controlled to have a free ammonia equivalence of at least about 12.4. Gas stripping techniques that employ spraying should be controlled such that the suspended droplets from the spraying operation have a free ammonia equivalence of at least about 12.4. Gas stripping by spraying can, depending upon meteorological conditions, cool the gaseous phase to such an extent that the free ammonia equivalence can drop significantly below 12.4. For example, conditions of low humidity, low temperatures, high winds, or combinations thereof can lower the temperature of the droplets in the gaseous stage by as much as 10°–15° F. or more. In order to counteract such cooling, it is advisable to add sufficient amounts of alkaline reagent to overcome any significant drop in temperature of the suspended droplets.

Heated stripping gases can be employed to provide numerous beneficial effects or to minimize the impact of uncontrollable external factors. Thus, heated stripping gases can be employed when the ambient temperature or the temperature of the wastewater falls below 15° C. Heated stripping gases can also be employed to increase the rate of stripping, which may be necessary due to the unusual weather conditions or due to space limitations that restrict the number of ponds that can be established. Heated stripping gases can also be used to insure more complete removal of un-ionized ammonia. In addition to lowering the temperature of the phase being stripped, gas stripping may also lower the pH value of the phase being stripped if the stripping gas contains acid forming constituents such as carbon dioxide, sulfur dioxides, or nitrous oxides. Precautions must be taken to maintain the free ammonia equivalence of the phase being stripped to at least about 12.4; thus additional amounts of lime or caustic can be added during stripping or, most conveniently, the initial additions of caustic or lime are sufficient great to offset the adverse effects of acid-forming constituents in the stripping gas.

The effluent from gas-stripping operation 25 containing less than about 10 ppm $NH_3(N)$—T is sent to acid treatment stage 27, where sufficient mineral acid (26) or acid-forming constituent, e.g., sulfuric or hydrochloric acid is added to lower the un-ionized ammonia content to less than about 0.05 ppm $NH_3(N)$. The pH may generally range from about 6 to 8.

A brief discussion of the processes that may be employed for removing ammonia is given as follows:

Air Stripping (Towers)

Air stripping is dependent upon pH and temperature. Ammonia stripping requires raising the pH to a value of at least about 10.5 and, preferably, in the range of about 10.8–11.5, with lime or caustic.

Figure 2:
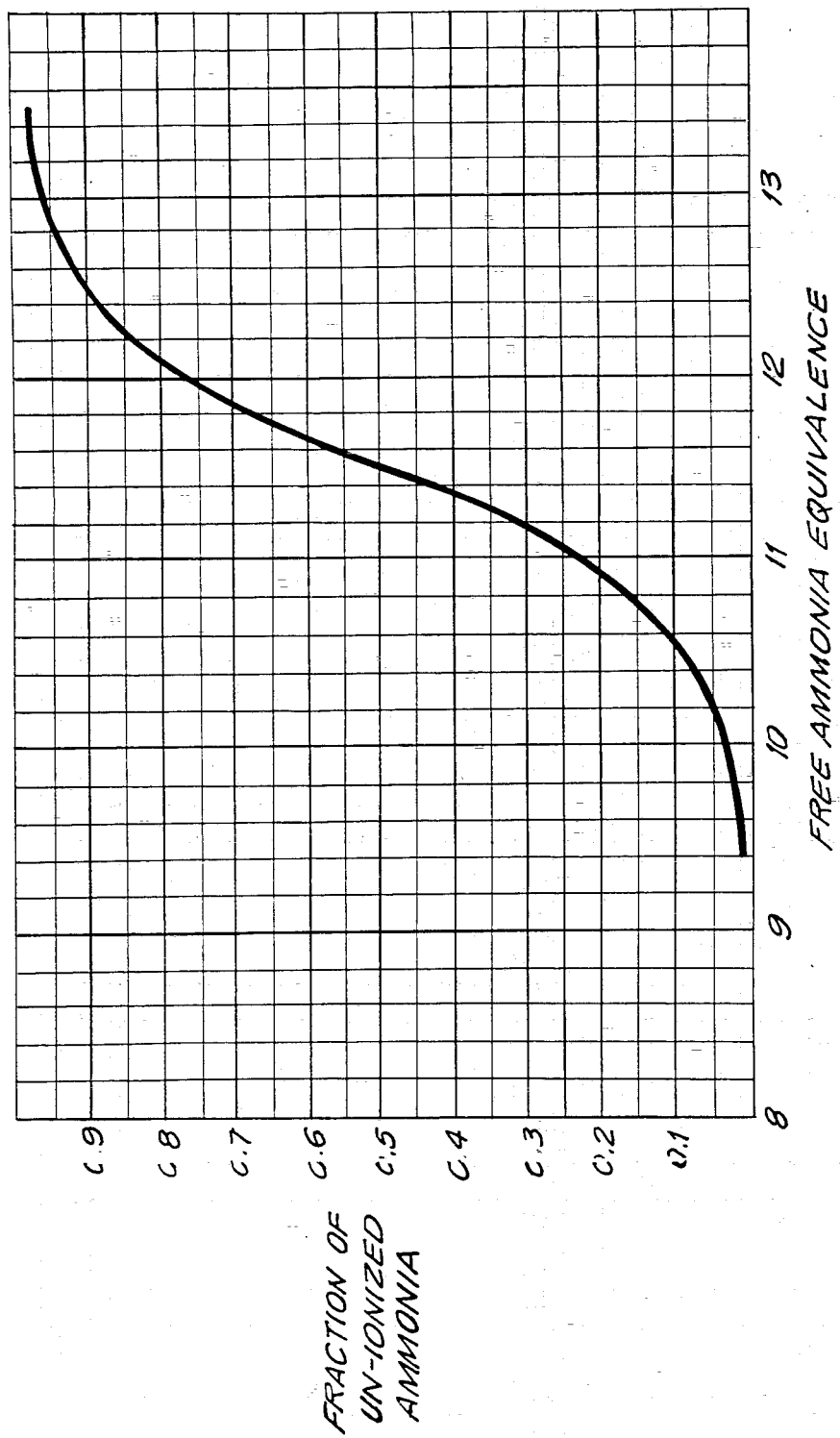
FIG. 2 is a graph which shows the effect of the Free Ammonia equivalence (FAE) on the distribution of un-ionized ammonia in the wastewater.

As stated above ammonia stripping consists of increasing the pH of the wastewater to provide a free ammonia equivalence of at least about 12.4 (FIG. 2) before passing the treated wastewater to the stripping tower. The formation and reformation of droplets (the phase being stripped) in the stripping tower provide increased air-water contact and droplet agitation with the passage of large quantities of air through the tower. As long as the free ammonia equivalence of the droplets is maintained at a value of at least about 12.4, the total ammonia content is readily lowered to less than about 10 ppm $NH_3(N)$—T. The stripping is preferably carried out in two or more stages.

As stated hereinbefore, the rate of ammonia gas transfer from liquid to air is influenced by pH, temperature, relative ammonia concentrations, and agitation of the air-water interface. Countercurrent towers, where air enters the bottom and exhausts from the top while water flows down through the tower packing, are generally more efficient than cross-flow units.

Pond Stripping

Pond stripping is similar to stripping in towers. The pH is adjusted to provide a free ammonia equivalence of at least about 12.4 to convert the ammonium ion to free ammonia. Un-ionized ammonia is then stripped by spraying pond water into the air to give the necessary gas/liquid transfer. Temperature is important in achieving the desired efficiency. For example, under cooler ambient conditions, the efficiency is expected to be lower. This can be compensated for by using more ponds in series, using greater air circulation, heating water or by employing heated spraying gases. As in tower stripping, the stripping is preferably carried out in two or more stages.

Figure 3:
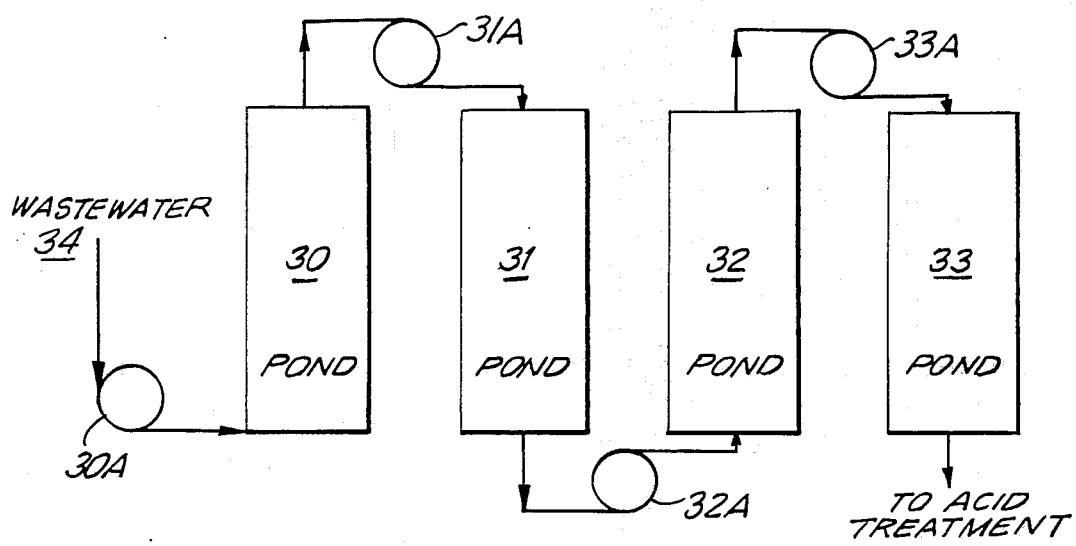
FIG. 3 depicts another embodiment illustrating the removal of ammonia from wastewater, the system comprising a series of spray ponds with spray pumps connected in series between ponds.

Advantages for pond stripping over tower stripping are low capital cost and simplicity of construction and operation. This method provides very acceptable results and is not as cost intensive as other processes. The use of ponds in series (i.e., more than two stages) is illustrated in FIG. 3, the ponds being indicated by numerals 30, 31, 32 and 33. Wastewater 34 at a pH value sufficiently high to provide a free ammonia equivalence of at least about 12.4, e.g., in excess of about 12.5, is delivered to pond 30 by pump 30A, the wastewater being sprayed into the pond to effect removal of un-ionized ammonia. The water from pond 30 is removed by pump 31A and sprayed into pond 31 to remove additional ammonia, and so on, to the last pond 33 where sufficient total ammonia $[NH_3(N)$—T] is removed from the effluent to a level not exceeding about 10 ppm.

In spraying wastewater from pond to pond, the conditions of spraying are controlled such that the droplets falling in the succeeding pond have a free ammonia equivalence of at least about 12.4.

FINAL pH ADJUSTMENT

The de-ammoniated water, whether from pond stripping or tower stripping, is then sent to acid treatment to lower the un-ionized ammonia to less than about 0.05 ppm $[NH_3(N)]$, and more preferably, not exceeding about 0.02 ppm $[NH_3(N)]$. The pH may generally range from about 6 to 8.

In lowering the un-ionized ammonia to less than about 0.05 ppm, the amount of mineral acid or acid-forming constituent added should be sufficient to provide a pH value such that the free ammonia equivalence does not exceed a value determined as follows:

$$FAE = 10.2 - \log_{10} \text{ ppm } NH_3(N)-T$$

In achieving an un-ionized ammonia content not exceeding about 0.02 ppm, the amount of acid added should be sufficient to provide a free ammonia equivalence that does not exceed a value determined as follows:

$$FAE = 9.8 - \log_{10} \text{ ppm } NH_3(N)-T$$

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for the treatment of wastewater of pH ranging from about 1.5 to 3 containing at least about 100 ppm phosphorus as phosphate ions, at least about 50 ppm fluorine as fluoride ions and ammonia as ammonium ions in excess of about 15 ppm $NH_3(N)$—T which comprises:

removing said phosphate and said fluride ions from said wastewater in a two-stage precipitation step; the first stage precipitiation being conducted at pH ranging from about 3.5 to 6.5 using an alkaline material selected from the group consisting of limestone ($CaCO_3$) and lime sufficient to form a precipitate which is removed in a first stage settler to provide an effluent which is treated in a second stage precipitation at a pH of at least about 10.5 using lime as the alkaline material sufficient to form a precipitate which in removed in a second stage settler to provide substantially clear effluent containing said ammonia;

maintaining the pH of said ammonia-containing effluent at a level sufficient to provide a free ammonia equivalence (FAE) of at least about 12.4;

said free ammonia equivalence being determined as follows:

$$FAE = pH + (\theta/15)0.5,$$

wherein pH is the pH value of the effluent and $\theta$ is the temperature of said effluent in degrees Fahrenheit, gas stripping said effluent to lower the total ammonia content thereof to a value of less than about 10 ppm $NH_3(N)$—T, said gas stripping being controlled to maintain the free ammonia equivalence of the effluent at a value of at least about 12.4 and then acidifying the stripped effluent to lower the un-ionized ammonia content to less than about 0.05 ppm $NH_3(N)$, the amount of acid added being sufficient to provide a pH value such that the free ammonia equivalence does not exceed that value determined as follows:

$$FAE = 10.2 - \log_{10} \text{ppm } NH_3(N) - T.$$

2. The method of claim 1, wherein the gas stripping of un-ionized ammonia is carried out in two or more stages.

3. The method of claim 2, wherein said two or more stages comprise spray ponds.

4. The method of claim 2, wherein said two or more stages comprise spray towers.

5. The method of claim 2, wherein the free ammonia equivalence during gas stripping is in excess of about 12.5.

6. The method of claim 1, wherein the free ammonia equivalence is maintained at a value of at least about 12.4 in the phase being stripped by using a heated stripping gas.

7. The method of claim 1, wherein the amount of acid added to the effluent to lower the un-ionized ammonia content to not more than about 0.02 ppm is that amount sufficient to provide a pH value such that the free ammonia equivalence does not exceed that value determined as follows:

$$FAE = 9.8 - \log_{10} \text{ppm } NH_3(N) - T.$$

8. A method for the treatment of contaminated wastewater of pH ranging from about 1.5 to 3 containing at least about 100 ppm phosphorus as phosphate ions and at least about 50 ppm fluorine as fluoride ions and ammonia as ammonium ions in excess of about 15 ppm $NH_3(N)$—T which comprises:

treating said wastewater with an amount of an alkaline agent selected from the group consisting of limestone ($CaCO_3$) and lime sufficient to raise and maintain the pH at a level of about 3.5 to 6.5 following uniform mixing thereof in a first stage precipitation to effect substantial precipitation of said contaminants, passing said treatment wastewater to a first stage settler to effect solid/liquid separation thereof sufficient to provide a sludge of said precipitated contaminants which is removed for disposal thereof and provide an effluent substantially impoverished in said contaminants, treating said contaminant-impoverished effluent to a second stage precipitation with lime in an amount sufficient to raise and maintain the pH of said effluent at a level of at least about 10.5 following uniform mixing thereof, whereby a further precipitate of said contaminants is produced having improved settling properties, passing said lime-treated effluent at said pH to a second stage settler at which a flocculant is added to provide flocs of said precipitate which settle rapidly to form a sludge thereof and a clear effluent, removing said sludge and providing a clear effluent containing ammonia and characterized in that further precipitation of solids is substantially minimized or eliminated downstream of said effluent discharge, maintaining the pH of said ammonia-containing effluent at a level sufficient to provide a free ammonia equivalence (FAE) of at least 12.4;

said free ammonia equivalence being determined as follows:

$$FAE = pH + (\theta/15)0.5,$$

wherein pH is the pH value of the effluent and $\theta$ is the temperature of said effluent in degrees Fahrenheit, gas stripping said effluent to lower the total ammonia content thereof to a value of less than about 10 ppm $NH_3(N)$—T, said gas stripping being controlled to maintain the free ammonia equivalence of the effluent at a value of at least about 12.4, and then acidifying the stripped effluent to lower the un-ionizd ammonia content to less than about 0.05 ppm $NH_3(N)$, the amount of acid added being sufficient to provide a pH value such that the free ammonia equivalence does not exceed that value determined as follows:

$$FAE = 10.2 - \log_{10} \text{ppm } NH_3(N) - T.$$

9. The method of claim 8, wherein a portion of the sludge from the second stage settler is recycled to second stage precipitation.

10. The method of claim 9, wherein the sludge portion recycled to second stage precipitation amounts to about 30% to 90% by volume of the sludge discharged from the second settler.

11. The method of claim 10, wherein the sludge remaining following sludge recycle from the second stage settler is discharged and/or recycled to first stage precipitation.

12. The method of claim 8, wherein the gas-stripping of un-ionized ammonia is carried out in two or more stages.

13. The method of claim 12, wherein said two or more stages comprise spray ponds.

14. The method of claim 12, wherein said two or more stages comprise spray towers.

15. The method of claim 12, wherein the free ammonia equivalence during gas-stripping is in excess of about 12.5.

16. The method of claim 8, wherein the free ammonia equivalence is maintained at a value of at least about 12.4 in the phase being stripped by using a heated stripping gas.

17. The method of claim 8, wherein the amount of acid added to lower the un-ionized ammonia content to not more than about 0.02 ppm is that amount sufficient to provide a pH value such that the free ammonia equivalence does not exceed that value determined as follows:

$$FAE = 9.8 - \log_{10} \text{ppm NH}_3(N) - T.$$

* * * * *